United States Patent [19]
Saito

[11] Patent Number: 5,494,073
[45] Date of Patent: Feb. 27, 1996

[54] FLUID CONNECTOR

[75] Inventor: Shunichi Saito, Tokyo, Japan

[73] Assignee: Nitto Kohki Co., Ltd., Tokyo, Japan

[21] Appl. No.: 267,893

[22] Filed: Jul. 6, 1994

[30] Foreign Application Priority Data

Jul. 7, 1993 [JP] Japan .................. 5-042475 U

[51] Int. Cl.⁶ ......................................... F16L 37/28
[52] U.S. Cl. .................... 137/614.03; 251/149.6
[58] Field of Search .................. 137/614.03, 614.04, 137/614.05, 614, 614.06, 614.02; 251/149.6

[56] References Cited

U.S. PATENT DOCUMENTS

| | | | |
|---|---|---|---|
| 952,905 | 3/1910 | Hough et al. | 137/614.04 |
| 2,319,015 | 5/1943 | Speth | 137/614.03 |
| 2,898,963 | 8/1959 | Courtot. | |
| 3,097,867 | 7/1963 | Saloum. | |
| 3,205,911 | 9/1965 | Swick, Jr. | 137/614.03 |
| 3,731,705 | 5/1973 | Butler. | |
| 3,778,092 | 12/1973 | Magorien. | |
| 4,373,551 | 2/1983 | Shindelar | 137/614.04 X |

FOREIGN PATENT DOCUMENTS

| | | |
|---|---|---|
| 995589 | 6/1965 | United Kingdom. |
| 1023267 | 3/1966 | United Kingdom. |
| 1408537 | 10/1975 | United Kingdom. |
| 2121500 | 12/1983 | United Kingdom. |

*Primary Examiner*—Martin P. Schwadron
*Assistant Examiner*—Kevin L. Lee
*Attorney, Agent, or Firm*—Nixon & Vanderhye

[57] ABSTRACT

A fluid connector is provided with a socket, a plug and a locking mechanism for locking the plug inserted in the socket. The socket has an axial passage and a first valve mechanism, for opening and closing the axial passage. The first valve mechanism includes a valve stem having one end fixed to the socket and the other end formed with a valve seat, a sleeve-like slide member movable in the axial passage with respect to the socket in a sealing state, a first packing provided on the slide member, for opening and closing the passage in cooperation with the valve seat, and urging means for urging the slide member toward the valve seat and causing it to abut against the first packing. The plug has an end portion capable of being inserted in the socket and a plug main body formed with an axial holes. A second valve mechanism for opening and closing the axial hole is provided in the plug main body. The second valve mechanism includes a valve member slidably provided in the plug main body and urged toward the end portion of the plug main body, and a second packing provided in the end portion of the plug main body, for retaining the valve member and closing the axial hole in cooperation with the valve member.

18 Claims, 2 Drawing Sheets

FLUID CONNECTOR

BACKGROUND OF THE INVENTION

1. Field of the Invention

The present invention relates to a fluid connector having a socket and a plug.

2. Description of the Related Art

As shown in FIG. 6, conventional plug 60 used for the fluid connector of this type comprises a plug main body 61 and a rear body 63. A valve seat 62 is arranged on the inner wall of the front end portion of the plug main body 61. A valve 64, a spring 65 for urging the valve 64 and a supporting tube 66 are inserted in the plug main body 61 from its rear end. They are assembled by connecting the rear body 63 to the plug main body 61 so as to form a valve mechanism. In this structure, however, both the plug main body 61 and the rear body 63 require spanner tightening portions 67 and 68, respectively, when the rear body 63 is connected to the plug main body 61, making the length of the plug 60 large. Thus, the plug 60 becomes bulky and it takes a long time to assemble the plug 60. Further, the number of components of the valve mechanism becomes large.

SUMMARY OF THE INVENTION

The object of the present invention is to reduce the number of the components of the valve mechanism and to reduce the size of the plug.

In order to solve the problems as mentioned above, a fluid connector according to the present invention includes a socket comprising a tubular main body provided with a locking mechanism and a rear body, and a plug fitted in the socket. A valve stem having a valve seat on its front end is provided in the fluid passage in the socket. A slide valve is provided at its front end portion with a packing for engaging the valve seat and sealing the fluid and is urged by a spring. A valve urged by a spring is slidably provided in a fluid passage formed in the plug main body. On one end of the outer peripheral surface of the plug main body is formed a retaining depression which engages the locking mechanism. On the inner face of the front end portion of the plug main body is provided a packing having a valve seat for retaining the front end portion of the plug main body and sealing fluid.

When the locking mechanism provided on the tubular main body is released and the plug is inserted in the fluid passage of the socket, the valve stem in the fluid passage enters the packing provided on the front end of the plug, and the packing abuts against the packing provided on the inner face of the front end of the slide valve so as to seal fluid. As the plug is further pushed into the socket, the slide valve retracts against the urging force of the spring and is separated from the valve seat so as to open the fluid passage.

Simultaneously with the opening of the fluid passage, the front end face of the valve stem abuts against the front end face of the valve provided in the fluid passage of the plug. The valve is retracted against the urging force of the spring and is separated from the valve seat formed on the packing. The fluid passage is opened and fluid flows from the socket into the plug. When the plug is fully inserted in the fluid passage, the locking mechanism engages the retaining depression formed in the outer peripheral surface of the plug, and plug is fixed to the socket. The packing or packings of the slide valve and/or the plug main body project from the front end face or front end faces of the slide valve and/or the plug main body so that and fluid is sealed by the packings of the slide valve and the plug main body.

According to the fluid connector of the present invention, the packing, provided in the plug, acts as a seal member and also acts as a stop element for preventing the valve from slipping off the front end portion of the plug when the plug is not connected to the socket. On the other hand, this packing performs sealing when the plug is connected to the socket. Thus, the packing which is a single element can be used for multiple purposes. Further, the valve and the spring can be mounted in the plug main portion at its front end. Thus, the number of components of the plug is reduced and the plug can be made small and light in weight. This reduces the manufacturing cost of the plug.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
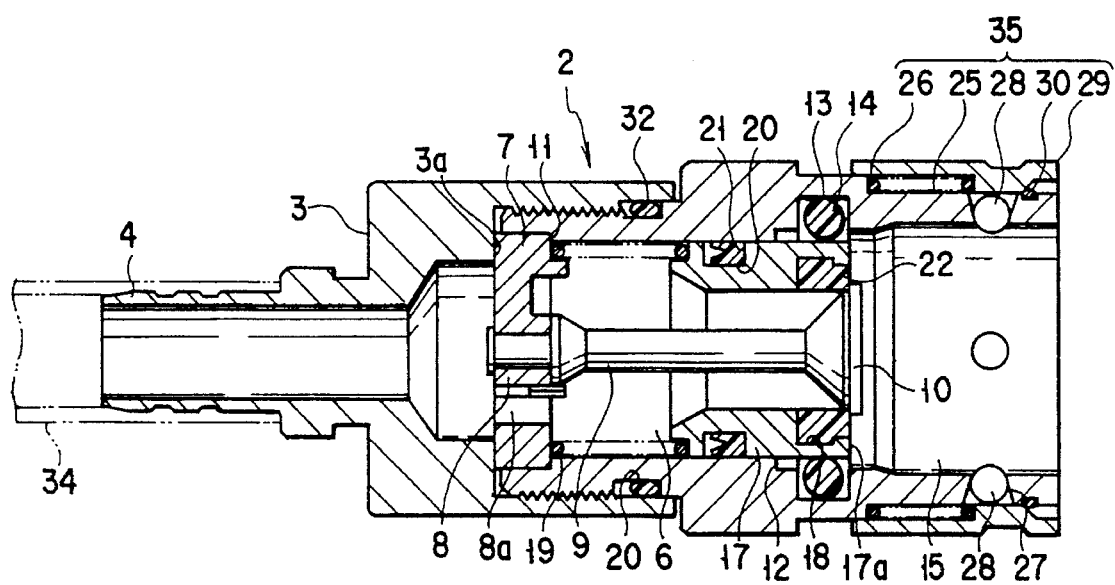
FIG. 1 is a longitudinal cross-sectional view of a socket according to one embodiment of the present invention.
Figure 2:
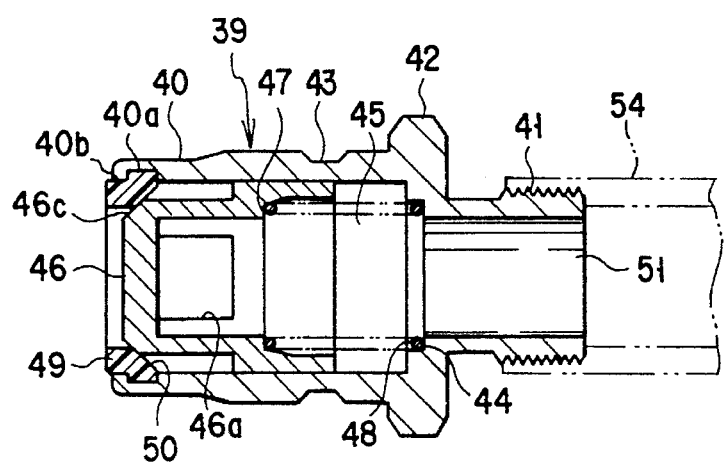
FIG. 2 is a longitudinal cross-sectional view of a plug according to one embodiment of the present invention.
Figure 3:
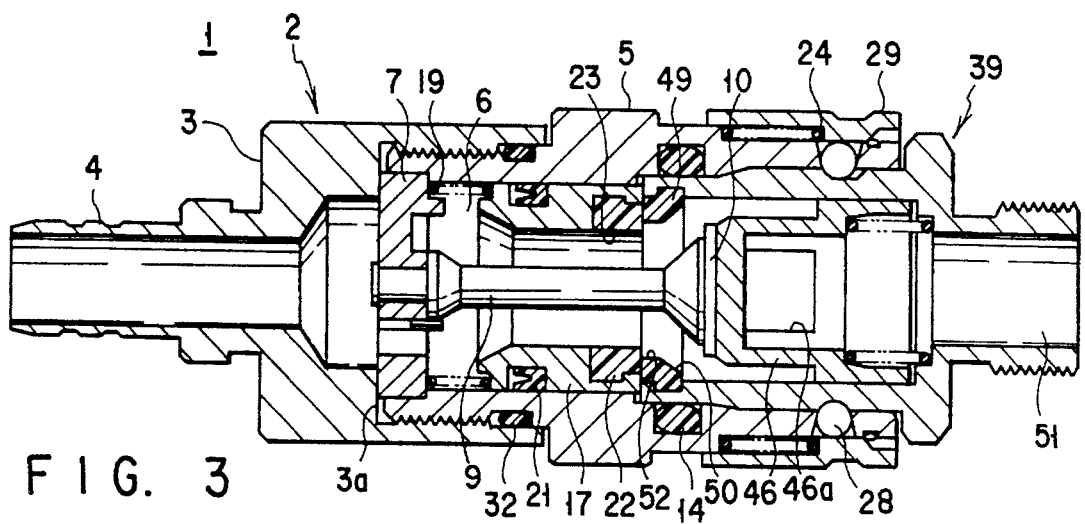
FIG. 3 is a longitudinal cross-sectional view of the socket and plug which are in a connected state.
Figure 4:
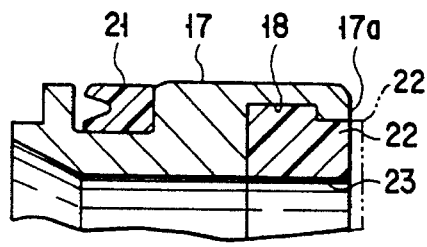
FIG. 4 is an enlarged cross-sectional view of the main part of a slide valve.
Figure 5:
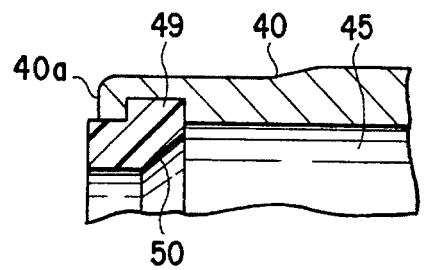
FIG. 5 is an enlarged cross-sectional view of the main part of the front end portion of the plug.
Figure 6:
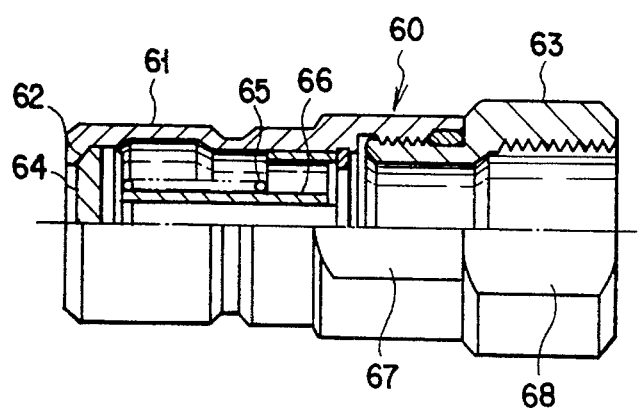
FIG. 6 is a longitudinal cross-sectional view of a conventional plug.

The preferred embodiments of the present invention will be described with reference to the drawings. As shown in FIGS. 1 to 3, a fluid connector 1 comprises a socket 2 and a plug 39. The socket 2 comprises a rear body 3 and a tubular main body 5. A guide 7 which is an annular disc member is housed in the rear body 3 formed at its rear end with a nipple 4 for connecting a fluid conduit 34, such as a hose or pipe. In the center of the guide 7 is formed a holding portion 8 for fixing the rear end portion of a valve stem 9 provided at its front end with a valve seat 10. A plurality of communication port 8*a* are formed around the holding portion 8. When the rear body 3 and the tubular main body 5 are screwed together, the guide 7 is clamped between a step portion 3*a* formed in the rear body 3 and a retaining portion 11 provided on the rear portion of the tubular main body 5.

A housing chamber 15 for receiving the plug has a slightly large diameter and is formed in front of a retaining step 12 arranged in an intermediate portion of the interior of the tubular main body 5. A seal ring 14 is provided in an annular groove 13 formed in the front inner wall of the retaining step portion 12. A tubular slide valve 17 is axially slidably received in the tubular main body 5. A first spring 19 is compressedly clamped between the rear end of the slide valve 17 and the guide 7. A second seal ring 21 for sealing a gap between the tubular main body 5 and the slide valve 17 is provided in a second annular groove 20 formed in the outer peripheral surface of the slide valve 17. A first packing 22 is provided in the front end of the slide valve 17.

The first packing 22 is fixedly fitted in a third annular groove 18 formed in the front end of the inner wall of the slide valve 17. The front end face 17a is made flush with the front end face of the packing 22. Alternatively, the front end face of the packing 22 may be protruted over the front end face 17a (shown in famtom line in FIG. 3). The slide valve 17 is urged forwardly at its rear end by the first spring 19 and is retained on a valve seat 10 provided on the front end of the valve stem 9 so that the slide valve 17 is prevented from slipping off a fluid passage 6 formed in the tubular main body 5 and the packing 22 is seated on the valve seat 10 so as to seal the fluid.

A small-diameter portion 25 is formed on the front end portion of the outer peripheral surface of the tubular main body 5, and balls 28 are idly fitted in a plurality of taper holes 27 provided in the front end portion of the peripheral wall of the small-diameter portion 25. A sleeve 29 is axially slidably mounted on the small-diameter portion 25 and is urged by the second spring 26. The balls 28 idly fitted in the taper holes 27 are pressed in the centripetal direction. A stop ring 30 for preventing the sleeve 29 from slipping off in the forward direction is fixed to the front end of the small-diameter portion 25. In this way a locking mechanism 35 is constituted.

Next, the plug 39 will be described. On the outer peripheral surface of the plug main body 40 formed on the rear end portion with a threaded portion 41 connectable to a fluid conduit 54, such as a pipe, hose or the like, a spanner engaging portion 42 for threadably connecting the plug to the fluid conduit, and a retaining depression 43 for retaining the balls 28 are formed. In the plug 39, an axial bore or a fluid passage 51 extends from the front end to an intermediate portion, and a valve chamber 45 having a larger diameter extends from the rear end to the intermediate portion. A retaining portion 44 is formed between the fluid passage 51 and the valve chamber 45. In the valve chamber 45 is axially slidably provided a stepped valve 46 having a plurality of radial flow holes 46a. A third spring 48 is compressedly clamped between the retaining portion 44 and a receiving portion 47 formed in the valve. A second packing 49 for preventing the valve from slipping off the valve chamber 45 is fitted in a fourth annular groove 40a formed in the inner wall of the front end portion of the plug main body 40. The front end of the second packing 49 provided in the front end portion of the plug main body slightly projects from the front end face 40b of the plug 39. On the interior of the rear end portion of the packing 49 is formed a tapered valve seat 50 on which an inclined face 46c formed on the outer peripheral surface of the front portion of the packing 49 rests so as to close the fluid passage 51.

The operation of this embodiment will be described. When the plug 39 is disconnected from the socket 2, the slide valve 17 is advanced in the fluid passage 6 by the force of the first spring 19 and engages the valve seat 10 provided on the front end of the valve stem 9 to close the fluid passage 5. Thus, fluid flowing from the conduit 34 connected to the nipple 4 is interrupted in the fluid passage 6 and the slide valve 17. Sealing between the tubular main body 5 and the slide valve 17 is performed by a seal ring 21, and the sealing between the rear body 3 and the tubular main body 5 is carried out by a third seal ring 32. Thus, no leakage occurs. In this condition, the sleeve 29 mounted on the small-diameter portion 25 is moved forwardly by the second spring 26. Since the balls 28 held in the tapered holes 27 formed in the small-diameter portion 25 are pressed in the centripetal direction, the balls 28 project into the housing chamber 15, and the plug 39 cannot be inserted in the socket 2.

The plug 39 is connected to the socket 2 in the following way. Referring to FIG. 1, the sleeve 29 is retreated against the second spring 26 to release the balls 28 idly fitted in the tapered holes 27. As the plug 39 is inserted in the housing chamber 15, the valve seat 10 of the valve stem 9 in the housing chamber 15 of the socket 2 enters the second packing 49 of the plug 39, and the packing 49 abuts against the first packing 22 provided in the front end portion of the slide valve 17 so as to seal the fluid. As the plug 39 is further pushed into the housing chamber 15, the slide valve 17 is retreated against the urging force of the first spring 19, and the fluid passage 6 is opened.

Simultaneously with the opening of the fluid passage 6, the front end face of the valve 46 in the plug 39 abuts against the valve seat 10 and the valve 46 is retreated against the urging force of the third spring 48 so as to open the fluid passage 51. Fluid flows from the fluid passage 6 to the interior of the plug 39 and then flows into the fluid passage 52 through fluid holes 46a formed radially in the small-diameter portion of the valve 46. Thereby, fluid communication between the conduits 34, 54 is established. When the plug 39 is fully inserted in the housing chamber 15, the retaining depressions 43 formed in the outer peripheral surface of the plug coincide with the balls 28 idly fitted in the taper holes 27 and retained in the retaining depressions 43. As a result, the sleeve 29 is advanced by the second spring 26 to push the balls in the centripetal direction. In this way, the plug 39 can be fixed to the socket 2 (FIG. 3).

When the first packing 22 provided on the front end of the slide valve 17 and the second packing 49 projecting from the front end of the valve 22 are abutted and pushed against each other, the front end face 17a of the slide valve 17 and the front end face 40b of the plug 39 are abutted against each other so that both packings 22 and 49 are not pressed by the force more than required. Thus, the material of both packings is prevented from being deteriorated due to a pressing force more than required and their durability is enhanced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fluid connector for communicating a first conduit with a second conduit, including a socket connected to said first conduit, a plug connected to said second conduit and detachably connected to said socket and a locking mechanism provided at said socket, for locking said plug fitted in said socket, the fluid connector comprising:

said socket having a rear body connected to said first conduit, and a tubular main body connected to said rear body and receiving said plug, said rear body and said tubular main body being formed with an axial passage;

a first valve mechanism for opening and closing said axial passage in said socket;

said first valve mechanism including a valve stem with one end fixed so as not to move axially relative to said socket and the other end provided with a valve seat, a sleeve-like slide member movable in said axial passage with respect to said socket in a sealing state, a first packing provided in said slide member and cooperating with said valve seat for opening and closing said passage, and urging means for urging said slide member toward a position at which said first packing and said valve seat close said passage;

said plug having a plug main body which is integrally formed as one body, said plug main body having a first end portion connected to said second conduit, a second end portion capable of being inserted in said socket and a cylindrical axial bore in fluid communication with said second conduit;

a second valve mechanism for opening and closing said axial bore being provided in said plug main body; and said second valve mechanism having a cylindrical valve member slidably provided in said axial bore of said plug main body and urged toward said second end portion, and a second packing provided on said second end portion of said plug main body, for retaining said valve member against an urging force applied thereto and closing said axial bore in cooperation with said valve member, one end of said valve member being guided along a circumferential surface of said cylindrical axial bore.

2. A fluid connector according to claim 1, wherein said first packing projects axially outwards from said slide member.

3. A fluid connector according to claim 1, wherein said second packing projects axially outwards from said plug main body.

4. A fluid connector according to claim 1, wherein said first packing and said second packing engage with each other in a sealing manner when said second end portion of the said plug main body is inserted in said socket.

5. A fluid connector according to claim 4, wherein said plug main body moves said slide member in a direction in which said slide member is separated from said seat of said valve stem and said valve stem moves said valve member in a direction in which said valve member is separated from said second packing, when said second end portion of said plug main body is inserted in said socket.

6. A fluid connector according to claim 1, further comprising a disc member having a peripheral portion held between said rear body and said tubular main body, said disc member having at least one communication port and a central portion for holding said valve stem.

7. A fluid connector according to claim 1, wherein said plug main body comprises an integral member.

8. A fluid connector according to claim 1, wherein said slide member has an end face abuttable against said plug main body, and said first packing is arranged flush with said end face.

9. A fluid connector according to claim 1, wherein said slide member has a seal ring for preventing leakage of fluid from a peripheral portion of said slide member.

10. A fluid connector according to claim 1, wherein said plug main body is opened in said axial bore, and has a tubular groove for holding said packing.

11. A fluid connector according to claim 1 wherein said cylindrical valve member includes an internal passage in communication with the second conduit, at least one radial opening through said cylindrical valve member in communication with said axial bore and with the first conduit when said valve member is slidable toward said first end portion to open said second valve mechanism.

12. A plug for use in combination with a socket, connected to a first fluid conduit, including a plug receiving chamber and valve mechanism which is opened when said plug is received in said plug receiving chamber and is closed when said plug is removed from said plug receiving chamber, said plug comprising:

a plug main body integrally formed as one body and having a first end portion connected to a second conduit, a second end portion for insertion into said plug receiving chamber and a cylindrical axial passage in communication with the second conduit;

a valve mechanism, provided in said plug main body, for opening and closing said axial passage; and said valve mechanism having a cylindrical valve member slidably provided in said plug main body and urged toward said second end portion, and a packing provided on said second end portion of said plug main body, for retaining said valve member against an urging force applied thereto and closing said axial passage in cooperation with said valve member, one of said valve member and a cylindrical axial passage of the plug main body being smoothly formed in an axial direction and one end of said valve member toward said first end portion being slidably guided along and in engagement with a circumferential surface of said cylindrical axial passage, another end of said valve member toward said second end portion having a reduced diameter defining an annular passage with said packing and said axial passage, said valve member having at least one radial opening therethrough in communication with said annular passage both when said valve member closes said axial passage and opens said axial passage.

13. A plug according to claim 12, wherein said packing sealingly engages with said socket to prevent fluid leakage from said axial bore when received in said plug receiving chamber.

14. A plug according to claim 12, wherein said axial bore is formed in a stepped bore having a step portion, and further comprising a spring, supported on the step portion, for urging said valve member toward said packing.

15. A plug according to claim 12, wherein said plug main body comprises an integral member.

16. A plug according to claim 12, wherein said plug main body comprises a portion engageable to a spanner on a outer periphery thereof.

17. A fluid connector according to claim 2, wherein said plug main body is opened in said axial bore, and has a tubular groove for holding said packing.

18. A fluid connector for communicating a first conduit with a second conduit, including a socket connected to said first conduit, a plug connected to said second conduit and detachably connected to said socket and a locking mechanism provided at said socket, for locking said plug fitted in said socket, the fluid connector comprising:

said socket having a rear body connected to said first conduit, and a tubular main body connected to said rear body and receiving said plug, said rear body and said tubular main body being formed with an axial passage;

a first valve mechanism for opening and closing said axial passage in said socket;

said first valve mechanism including a valve stem with one end fixed so as not to move axially relative to said socket and the other end provided with a valve seat, a sleeve-like slide member movable in said axial passage with respect to said socket in a sealing state, a first packing provided in said slide member and cooperating with said valve seat for opening and closing said passage, and urging means for urging said slide member toward a position at which said first packing and said valve seat close said passage;

said plug having a plug main body which is integrally formed as one body, said plug main body having a first end portion connected to said second conduit, a second end portion capable of being inserted in said socket and a cylindrical axial bore fluid-communicating with said second conduit;

a second valve mechanism for opening and closing said axial bore being provided in said plug main body; and said second valve mechanism having a cylindrical valve member slidably provided in said axial bore of said plug main body and urged toward said second end portion, and a second packing provided on said second end portion of said plug main body, for retaining said valve member against an urging force applied thereto and closing said axial bore in cooperation with said valve member, said valve member being slidable with respect to said plug main body and having a large-diameter portion guided in said axial bore, a small-diameter portion cooperating with said second packing, an end wall arranged at a side of said small-diameter portion, and an inner hole closed at a side of said small-diameter portion by said end wall, said large-diameter portion, said small-diameter portion, said end wall and said inner hole defining a stepped shape, said small-diameter portion and said plug main body defining an annular space therebetween, said small-diameter portion having at least one radial hole for causing said annular spacer to communicate with said inner hole.

* * * * *